United States Patent Office 3,275,675
Patented Sept. 27, 1966

3,275,675
PROCESS FOR MAKING CYCLOBUTANE-1,2-DICYANIDES
James D. Idol, Jr., Shaker Heights, Janice L. Greene, Warrensville Heights, and Nancy R. Gray, Cleveland, Ohio, assignors to The Standard Oil Company, Cleveland, Ohio, a corporation of Ohio
No Drawing. Filed Feb. 17, 1964, Ser. No. 345,076
3 Claims. (Cl. 260—464)

This invention relates to a process for making cyclobutane-1,2-dicyanides from an alpha,beta-olefinically unsaturated nitrile such as acrylonitrile.

It has been proposed heretofore to convert acrylonitrile to cyclobutane-1,2-dicyanide by heating the acrylonitrile in the liquid phase. The reaction involved can be represented by the following equation:

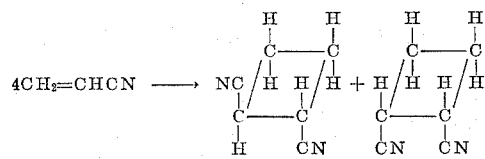

The product is capable of existing in either the cis or trans geometric isomeric form and both forms are produced by the foregoing reaction. The isomers may be readily separated from their mixtures by efficient vacuum distillation techniques. Similarly, other alpha-beta-olefinically unsaturated nitriles, such as methacrylonitrile, can be employed in the present process to form addition compounds of two of the unsaturated nitrile moieties.

The formation of cyclobutane dicyanides from alpha,beta-olefinically unsaturated nitriles having the structure

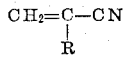

wherein R is hydrogen or a lower alkyl radical a specific example of which is acrylonitrile is normally accompanied by considerable formation of polymer. The polymer often interferes with the dimerization process by fouling the equipment, discoloring the product and generally lowering the yield of the desired product. The polymer is usually dark in appearance and the polymerization probably involves a reaction of the cyano groups as well as polymerization through the vinyl groups as often occurs in nitrile polymers when they are subjected to high temperatures.

We have discovered in accordance with our invention that if an alpha,beta-olefinically unsaturated nitrile such as acrylonitrile is heated in a liquid or vapor phase, at autogenous or elevated pressures, in the absence of air or oxygen, and in the presence of small amounts of indigo carmine dye, good conversions to the dimer, cyclobutane-1,2-dicyanide, can be obtained without, or at least with a minimum of, polymer formation. An additional enhancement is achieved by the addition of small amounts of water to the reaction mixture. The function of the water is not readily apparent but it probably increases the solubility of the indigo carmine in the reaction mixture. Other liquids which have a solubilizing action on the dye, such as the cyclobutane dcyanide itself, may be used in the process of this invention.

The structure of indigo carmine is as follows:

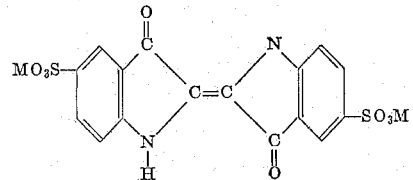

wherein M is hydrogen or a metal ion and preferably an alkali metal ion.

It is surprising that the disodium salt of indigo carmine, for instance, functions so well in the instant process in view of the results obtained with Congo red, also a disodium salt of a dye having the structure

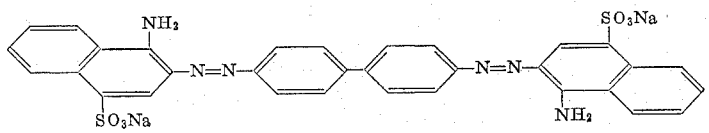

Dimerization reactions of acrylonitrile carried out in the presence of Congo red resulted in the nearly total conversion of acrylonitrile to dark polymeric material.

The process of the present invention is further illustrated in the following example wherein the amounts of ingredients are expressed as parts by weight unless otherwise indicated.

*Example*

In carrying out the process, acrylonitrile was placed in a stirred autoclave and the inhibitor was added. In some of the experiments (Tables I and III) a two-liter stainless steel autoclave was used and 800 grams of acrylonitrile were charged. The autoclave had a gas inlet tube and internal coils by means of which the contents could be heated or cooled. In other experiments (Tables II, IV, V, VI and VII) a 50 cc. autoclave was used and 20 grams of acrylonitrile were charged for each run. After the acrylonitrile was charged in the autoclave and the autoclave was sealed, nitrogen gas was passed through the inlet tube and the contents of the autoclave were thoroughly purged of oxygen. The inlet tube was then sealed and the reactor and contents were brought to reaction temperature and maintained at this temperature under autogenous pressure with stirring for a desired length of time. The autoclave was then cooled, opened, and the contents were removed for analysis and the condition of the internal surfaces of the autoclave was noted and rated as hereinafter described.

The contents of the reactor were analyzed chromatographically and the amounts of the reaction product and unreacted acrylonitrile were determined. The material balance based on acrylonitrile weight charge versus weight of the cyclobutane-1,2-dicyanide plus unreacted acrylonitrile gave an indication of the amount of undesirable polymer formation. Inside the reactor, the coils and the reaction mixture were examined visually and photographs of them were taken. On this basis, the extent of polymer formation was rated on a scale of from zero to ten. What was considered to be an unsuccessful run was one in which the nitrile component was converted completely to solid polymer and this was given a rating of zero. The rating scale is described in more detail in Table I. This scale is similar to, but not identical with that used for the smaller autoclave experiments. The ratings for the small reactor experiments are given in Table II.

A study of the reaction variables is summarized in Tables III to VII. The effect of adding 0.05% by weight of indigo carmine (disodium salt) to the reaction mixture is shown in Table III. The data shows that with indigo carmine present, conversion to the dimer is substantially constant while the polymer formation is considerably decreased. The addition of small amounts of water further reduces polymer formation, as shown by the data summarized in Table IV. The results obtained on the addition of water and indigo carmine, both separately and concurrently to the reaction mixture show that addition of water by itself (in amounts of 3%) results in the predominant conversion of acrylonitrile to polymer, even when added in substantial amounts. Although the addition of indigo carmine by itself greatly reduces polymer formation and increases dimer yield, further improvement is obtained with the combined use of 0.05% indigo carmine and 3% water.

The formation of polymer in the reactor is highly undesirable because it involves lengthy cleanup periods, and also the overall conversion of nitrile component to the desired addition product is decreased with increasing amounts of polymer formed.

The amount of inhibitor employed may vary from 0.01 to about 1.0% by weight based on the acrylonitrile charged. Generally, the preferred range is about 0.05 to 0.5% by weight. If water is employed, amounts ranging from 1% to 20% of water by weight based on acrylonitrile charged may be utilized. (Table IV.)

A study of the dimerization reaction in the vapor phase is shown in Table VI. The reaction mixture contained only indigo carmine inhibitor in amounts of 0.1% by weight. The experiments were conducted at low acrylonitrile pressures and therefore conversions were expected to be low. This effect is substantiated by data in Table I of British Patent No. 897,275 which shows that conversions to the dimer are increased with increased pressures. The data in Table VI show that though the yields of dimer were low, the indigo carmine successfully inhibited acrylonitrile polymerization for residence times of 0.25 to 1.0 hour at temperatures in the 265–278° C. range.

The effect of adding acrylonitrile dimer as a solvent in the vapor phase dimerization reaction is shown by the data in Table VII. The polymer ratings were improved where the acrylonitrile dimer was present at the beginning of the reaction.

The temperature of the reaction should be fairly high in order to achieve reasonable yields in a reasonable time. The minimum practical temperature is in the range of 175° to 200° C. and the maximum about 350° C. where the formation of by-products usually becomes excessive.

The reaction time or the reactor residence time exerts an effect on the amount of acrylonitrile monomer which can be converted to the dimer before excessive polymerization sets in. Generally, it has been found that to keep polymer formation at a minimum, shorter reaction times should be employed. Reaction times of from ¼ to about 7 hours may be employed, depending upon the reaction temperature used.

Methacrylonitrile was substituted for acrylonitrile in the foregoing procedure with similar results. Similarly, mixtures of acrylonitrile and methacrylonitrile in various proportions may be employed in the process of the present invention.

TABLE I

[Reaction temperature: 240° C. Reaction time: 3 hours]

| Polymer Rating | Liquid Appearance | Autoclave Interior |
|---|---|---|
| 10 | Clear, colorless or almost colorless. | No polymer. |
| 9 | Yellow to orange—very little polymer sediment. | Very thin polymer film, traces of loose polymer. |
| 8 | Orange liquid—probably polymer sediment. | Polymer film—<2 g. loose polymer. |
| 7 | Orange to brown—polymer sediment present. | Thin polymer coating on coils, sides, <5 g. loose polymer. |
| 6 | Brown-polymer sediment | Polymer coating on coils, sides, loose polymer. |
| 5 | do | Thick polymer coating on coils, sides, loose polymer. |
| 4 | do | Thick polymer coating on coils, sides, bottom, loose polymer. |
| 3 | Dark brown—begins to be rather viscous. | Much polymer (coils may be stuck). |
| 2 | Dark brown—viscous | Much polymer (coils probably stuck). |
| 1 | Very thick black goo nearly solid, low dimer conversion. | |
| 0 | All solid | |

TABLE II

[Reaction temperature: 240° C. Reaction time: 4 hours]

| Rating | Liquid Product Appearance | Autoclave Appearance |
|---|---|---|
| 10 | Clear, colorless or almost colorless. | No polymer. |
| 9 | Yellow—may contain some polymer sediment. | Trace of polymer. |
| 8 | Yellow-orange, may contain some polymer sediment. | Slightly more than trace of polymer. |
| 7 | Yellow-brown, probably contains polymer sediment. | Very thin (<1/16″) polymer build up in bottom, may have polymer film on sides. |
| 6 | Yellow-brown, polymer sediment. | Thin layer (<3/16″) polymer build up in bottom, may have polymer film on sides. |
| 5 | Orange-brown, polymer sediment. | Layer of polymer (~3/16–3/8″) on bottom, probably polymer film on sides. |
| 4 | Brown-polymer sediment | ~3/8–5/8″ polymer in bottom probably polymer film. |
| 3 | Brown liquid, may or may not be viscous. | >10 g. polymer. |
| 2 | Brown-viscous polymer, low dimer conversion. | Much polymer. |
| 1 | Very thick, nearly solid product. | |
| 0 | All solid polymer, NH$_3$ odor. | |

TABLE III

| Indigo Carmine | Time, Hours | Dimer Conversion | Material Balance | Polymer Rating |
|---|---|---|---|---|
| None | 3 | 18.1 | 89.5 | 4 |
| 0.05% | 3 | 19.3 | 96.8 | 9 |
| 0.05%+2.5% H$_2$O | 3 | 15.1 | 96 | 9.5 |

Conditions:
Nitrogen Purge, 30 Minutes.
Temperature, 240° C.

TABLE IV

| Additive | Dimer Conversion | Polymer Rating |
|---|---|---|
| 3.7% H$_2$O | 3.4 | 2 |
| 10% H$_2$O | 11.0 | 7 |
| 50% H$_2$O | 13 | 6 |
| 0.05% Indigo Carmine | 14.9 | 7 |
| 0.10% Indigo Carmine | 12.5 | 7 |
| 0.05% Indigo Carmine + 3% H$_2$O | 18.6 | 9 |
| 0.05% Congo Red | 0 | 0 |

Conditions:
Nitrogen purge, 3 minutes.
Temperature, 240° C.
Time, 4 hours.

TABLE V

| Weight Percent Indigo Carmine | Dimer Conversion | Polymer Rating |
|---|---|---|
| 0.05 | 14.9 | 7 |
| 0.10 | 12.5 | 7 |
| 0.50 | 15.7 | 7 |
| 1.00 | 15.0 | 5 |

Conditions:
Nitrogen Purge, 3 Minutes.
Temperature, 240° C.
Time, 4 Hours.

TABLE VI

| Temperature, °C.[1] | Time, Hours | Dimer Conversion | Polymer Rating |
|---|---|---|---|
| 265 | 0.25 | 1 | 10 |
| 275 | 0.50 | 3.5 | 10 |
| 276 | 0.75 | 9 | 9 |
| 278 | 1.0 | 18 | 7 |

Conditions:
Reactor Charge, 20 g. acrylonitrile plus 0.02 g. Indigo Carmine.
Nitrogen Purge, 3 Minutes.
[1] Temperature, Autoclaves were placed in a heated aluminum stirring block at a temperature of 275° C. Within 5 minutes the temperatures had fallen to 240° C. and then rose to the temperatures noted in the above table.

TABLE VII

| Charge | Time, Hours | Dimer Conversion | Polymer Rating |
|---|---|---|---|
| 30 ml. solution acrylonitrile | 1.0 | 13.2 | 8 |
| 40 ml. solution 45.1% AN dimer +54.9% acrylonitrile. | 1.0 | 9.2 | 9 |
| 40 ml. solution 46.3% AN dimer + 53.7% acrylonitrile +0.1% Indigo Carmine. | 1.0 | 8.0 | 9.5 |

Conditions:
Nitrogen Purge, 3 Minutes.
Temperature, 275° C.

It is to be understood that any of the conventional techniques in operating autoclaves and in working up the products may be employed as is obvious to one skilled in the art without departing from the scope of the present invention which is limited only by the appended claims.

We claim:

1. The process of forming a cyclobutane-1,2-dicyanide which comprises heating for from ¼ to about 7 hours at least one nitrile selected from the group consisting of acrylonitrile and methacrylonitrile to a temperature of from 175 to 350° C. in the substantial absence of molecular oxygen and in the presence of from 0.01 to about 1.0% by weight of indigo carmine dye having the structure

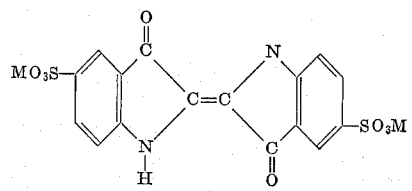

wherein M is selected from the group consisting of hydrogen and an alkali metal.

2. The process of claim 1 wherein the mononitrile is acrylonitrile.

3. The process of claim 2 wherein from 1 to 20% by weight of water is also employed.

No references cited.

CHARLES B. PARKER, *Primary Examiner.*

JOSEPH P. BRUST, *Assistant Examiner.*